United States Patent [19]

Sanders et al.

[11] 4,266,792
[45] May 12, 1981

[54] VEHICLE FENDER AND RUNNING BOARD SUPPORT

[75] Inventors: Earl Sanders, Battle Creek; Daniel Sanders, Lansing, both of Mich.

[73] Assignee: The Model A and Model T Car Reproduction Corporation, Battle Creek, Mich.

[21] Appl. No.: 79,999

[22] Filed: Sep. 28, 1979

[51] Int. Cl.³ .............................................. B62D 25/16
[52] U.S. Cl. ................................. 280/153 R; 296/187; 296/198; 296/199; 296/204
[58] Field of Search .......... 280/153 R, 153 B, 152 R, 280/163, 164; 296/185, 187, 196, 197, 198, 199, 202, 203, 204; 182/82

[56] References Cited

U.S. PATENT DOCUMENTS

| | | | |
|---|---|---|---|
| 1,266,938 | 5/1918 | Hassler | 280/163 |
| 1,678,657 | 7/1928 | Thomas | 280/164 R |
| 1,788,732 | 1/1931 | Moorhouse | 296/203 |
| 1,808,560 | 6/1931 | Ledwinka | 248/67 |
| 1,863,475 | 6/1932 | Fox | 280/153 R |
| 2,116,330 | 5/1938 | Tjaarda | 296/202 |
| 2,310,062 | 2/1943 | Broncato | 182/83 |
| 2,348,648 | 5/1944 | Reid | 296/199 |

*Primary Examiner*—Robert R. Song
*Attorney, Agent, or Firm*—Settle and Walker

[57] ABSTRACT

A fender and running board support for motor vehicles with a fiber glass body is disclosed. The running board and fender support of the present invention comprises a pair of spaced apart brackets with each bracket including a vertical portion extending downward from the vehicle frame and an outward extending horizontal portion integral with the vertical portion. A diagonal brace extends between the vertical portion and the horizontal portion and is welded thereto to provide additional structural integrity. A pair of spaced apart longitudinal members extend between the spaced apart brackets and are attached to the horizontal portion to abut and provide longitudinal support for the running board and front and rear fenders of the vehicle.

1 Claim, 3 Drawing Figures

VEHICLE FENDER AND RUNNING BOARD SUPPORT

BACKGROUND OF THE INVENTION

I. Field of the Invention

The present invention relates to the field of motor vehicles. More specifically the present invention relates to the field of motor vehicle running board supports. Even more particularly the present invention relates to the field of running board supports for motor vehicles having fenders and running boards made from fiber glass. More particularly the present invention relates to the field of running board and fender supports for motor vehicles having a one-piece front and rear fender and running board made from fiber glass.

II. Prior Art Statement

Vehicle running board supports have long been known. Typically the issued United States patents which disclose running board supports are for vehicles which include front and rear fenders mounted individually to the vehicle body and a separate running board which extends between the fenders and is supported by brackets attached to a transverse member of the vehicle frame.

U.S. Pat. No. 1,788,732 discloses in FIG. 11 a running board support attached to a transverse vehicle frame member.

U.S. Pat. No. 1,808,560 discloses a running board support which comprises an extension of a plurality of transverse frame members.

U.S. Pat. No. 2,116,330 discloses a running board support in FIG. 6 which comprises an outward extension of a transverse frame member 15.

U.S. Pat. No. 2,348,648 discloses a scuff plate which is basically a running board covered by the vehicle door when it has been closed. The scuff plate as illustrated in FIG. 3 comprises an outward extension of the bottom wall of the vehicle.

The above listed United States patents constitute the closest art known to the inventor and his Attorney.

SUMMARY OF THE INVENTION

It is an object of this invention to provide a vehicle running board support. It is also an object of this invention to provide a vehicle running board and fender support. It is also an object of this invention to provide a vehicle and running board support for vehicles employing a one piece front and rear fender, running board, and scuff plate member made from fiber glass. It is a further object of the present invention to provide longitudinal support for the fenders and running board of the vehicle, the longitudinal support extending from the front fender to the rear fender of the vehicle.

The vehicle and running board support of the present invention comprises a pair of spaced apart brackets, with each bracket including a vertical portion extending downward from the vehicle frame and a horizontal portion integral with a bottom end of the vertical portion, the horizontal portion extending outward a distance, with a diagonal brace extending between the vertical portion and the horizontal portion and welded thereto to improve the structural integrity of the bracket. A pair of spaced apart longitudinal members extend between the spaced apart brackets and are attached to the brackets horizontal portion by welding or other suitable means to form an integral running board support. The spaced apart longitudinal members abut a bottom wall of the running board to provide running board longitudinal support. The longitudinal members terminate at a rear end of the front fender providing support for the front fender and at a front end of the rear fender providing support for the rear fender.

For a more complete understanding of the present invention, reference is made to the following detailed description and accompanying drawings.

Other objects, advantages, and applications of the present invention will become apparent to those skilled in the field to which this invention pertains, when the accompanying description of the best modes contemplated for practicing the invention are read in conjunction with the accompanying drawings.

BRIEF DESCRIPTION OF THE DRAWINGS

In the drawings like reference numbers refer to like parts throughout the several views, and wherein.

DESCRIPTION OF THE PREFERRED EMBODIMENT

Figure 1:
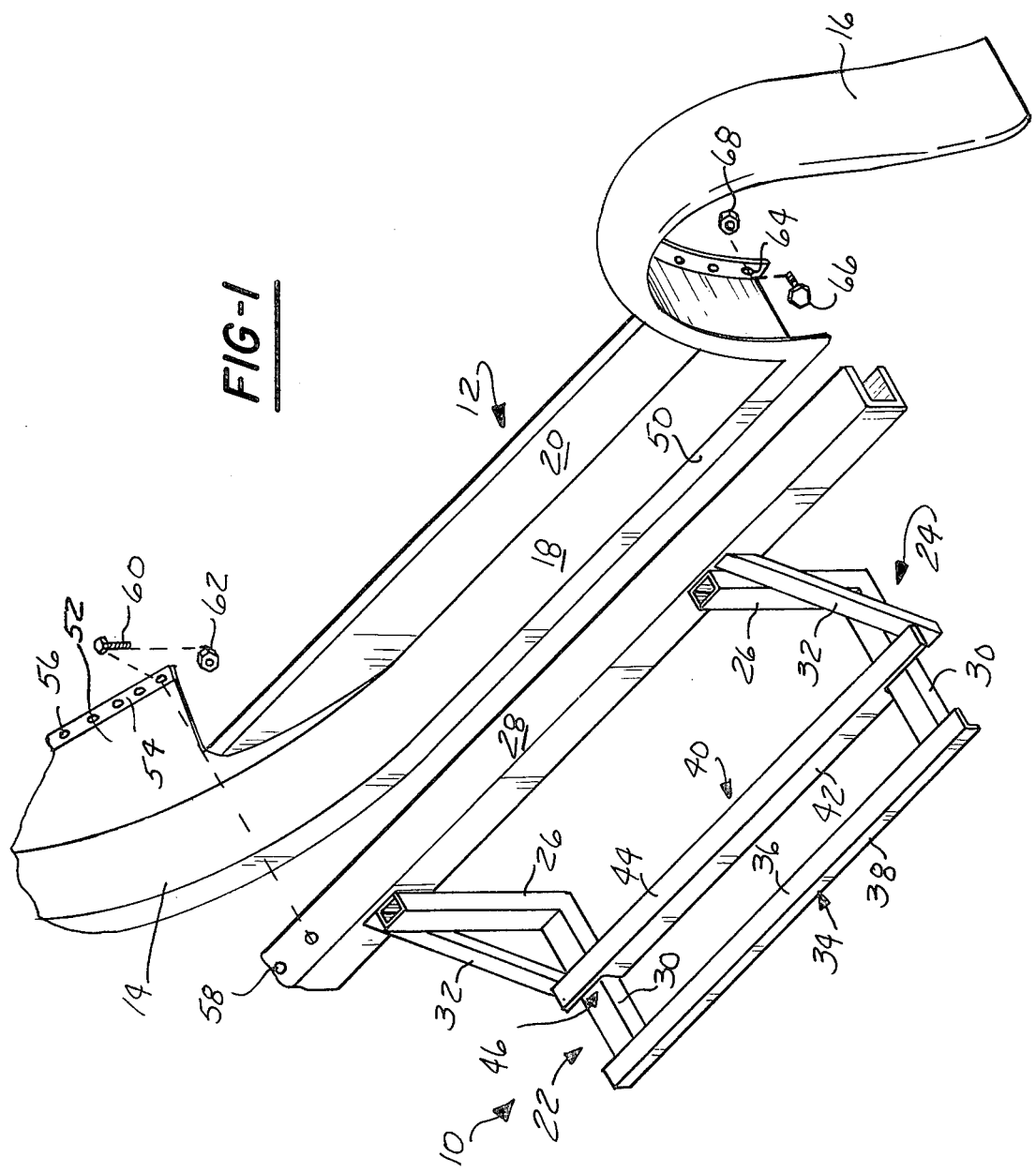
FIG. 1 illustrates an exploded broken perspective view of the running board and fender support of the present invention.
Figure 2:
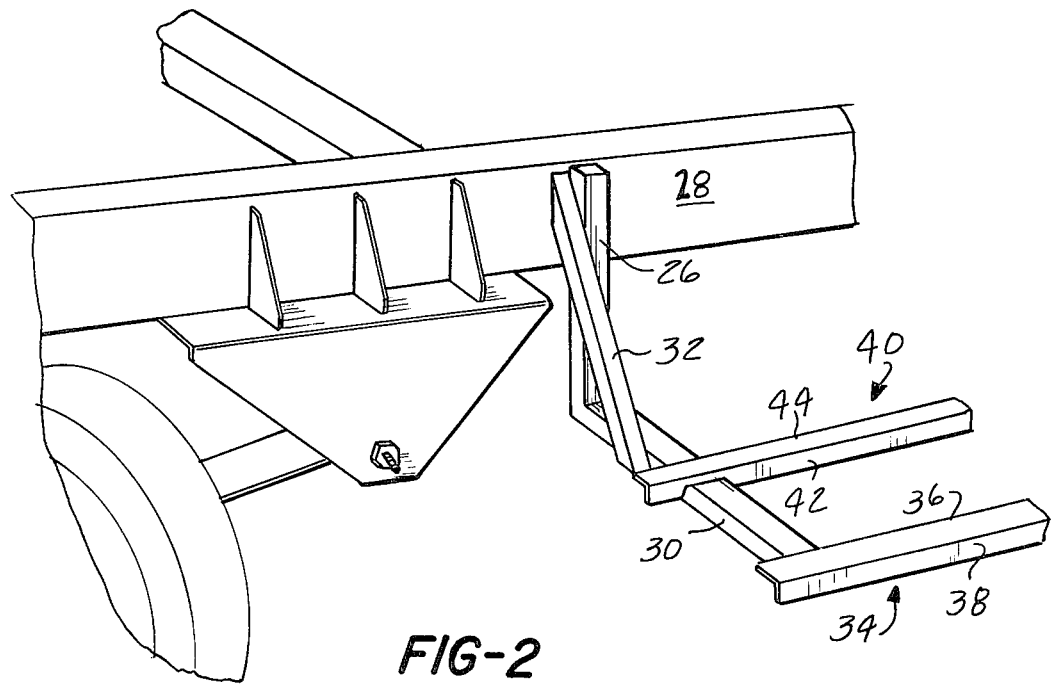
FIG. 2 illustrates a broken perspective view of the bracket of the present invention.
Figure 3:
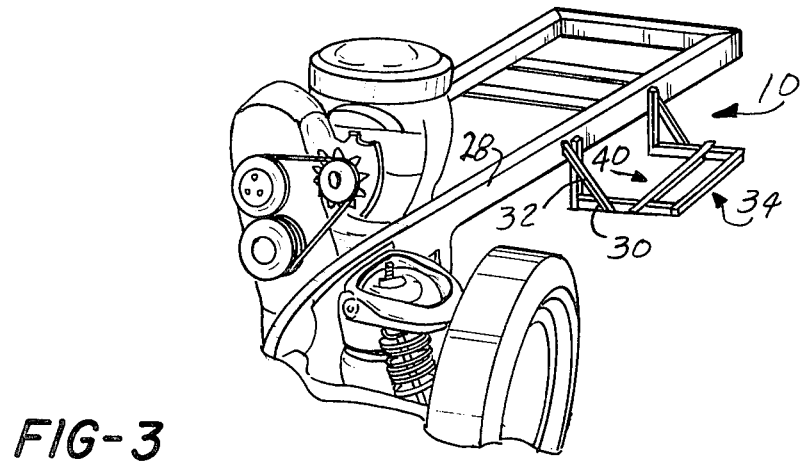
FIG. 3 illustrates a broken perspective view of the vehicle frame and support bracket of the present invention.

In a preferred embodiment the vehicle fender and running board support 10 of the present invention is configured to support a one piece member 12 which comprises a front fender 14, a rear fender 16, integral with a running board 18, and a scuff plate 20.

The support 10 comprises a pair of spaced apart brackets 22,24. Each bracket 22,24 includes a vertical portion 26 extending downward from a vehicle frame longitudinal member 28 with an upper end of the vertical portion affixed to the frame 28 by welding or other suitable means. A horizontal portion 30 extends outward from a lower end of each of the vertical portions 26 and each horizontal portion 30 is affixed to the vertical portion 26 by welding or other suitable means. A diagonal brace 32 extends diagonally from an upper end of each vertical portion 26 to a point proximate the center of each horizontal portion 30 with the diagonal brace abutting a side wall of the vertical and horizontal portions. An upper portion of each brace 32 is angeled to abut the longitudinal member 28 and is affixed to both the longitudinal member 28 and the vertical portion 26 by welding or other suitable means to improve the structural integrity of the horizontal portion 30.

A first longitudinal member 34 extends longitudinally between the spaced apart brackets 22,24, extending therebeyond a distance. The first longitudinal member 34 includes a horizontal flange 36 which rests on an upper wall of the horizontal portion 30 and a vertical flange 38 which abuts an outer end of the horizontal portion 30 and is affixed thereto by welding or other suitable means. A second longitudinal member 40 is deployed parallel to the first longitudinal member 34 and positioned inward a distance therefrom to abut an upper wall of the diagonal braces 32. The second longitudinal member 40 includes a vertical flange 42 and a horizontal flange 44 integral therewith to form a structural angeled member. A pair of openings 46,48 are formed in the vertical flange 46 to allow the longitudinal member 40 to fit over the horizontal portions 30 with the horizontal flange 44 abutting the upper wall of the horizontal portions 30. The second longitudinal member 40 is affixed to the horizontal portions 30 by welding or other suitable means, and the members 34, 40 extend pass the spaced apart brackets 22,24 a distance to provide longitudinal support for the running board 18 which the longitudinal members abut throughout its length.

To mount the one piece member 12 to the vehicle body and frame the running board 18 is abutted to the longitudinal members 34,40 with a running board flange 50 overlaying and concealing the longitudinal member 34. A downward and inward extending portion 52 of the front fender 14 terminates abutting the longitudinal member 28. An inner end 54 of the extension 52 includes a plurality of apertures 56 aligned with a plurality of apertures 58 formed in the longitudinal member, and a plurality of bolts 60 engage the apertures 56,58. A plurality of nuts 62 threadingly engage the threaded end of the bolts 60 to secure the inner end 54 to the vehicle frame.

A plurality of apertures 64 formed in an inner flange of the rear fender 16 are aligned with a plurality of apertures (not shown) in the side of the vehicle body. A plurality of threaded fasteners 66 engage the aligned apertures with a plurality of threaded nuts 68 threadingly engaging the threaded end of the threaded fastener 66 to secure the rear fender to the vehicle body.

There has been described hereinabove a support for a front fender, running board, rear fender, and scuff plate of a vehicle that have been formed in a single piece from fiber glass. A substantial saving in vehicle cost, weight, and assembly labor is realized by employing the teachings of the present invention.

Having thus described my invention what I claim is:

1. In a vehicle of the type having a frame including a longitudinal frame member and a fiberglass body mounted on the frame and including a body sub-assembly comprising a pair of longitudinally spaced fenders joined by an integral running board and having a scuff plate extending between the fenders to cover the vertical distance between the frame and the running board which is located below the frame level, the improvement of a running board support concealed by said scuff plate and disposed between said fenders, comprising a pair of longitudinally spaced brackets having vertical legs secured at their upper ends to said frame to depend therefrom and horizontal legs located at the lower portions of said vertical legs to project outwardly relative to the frame, a diagonal brace reinforcing each horizontal leg and lying within the confines of said scuff plate when the body is mounted on the frame, and longitudinal supports secured to said horizontal legs to directly underlie and to directly support the running board when the body is mounted on said frame.

* * * * *